United States Patent Office 3,199,410
Patented Aug. 10, 1965

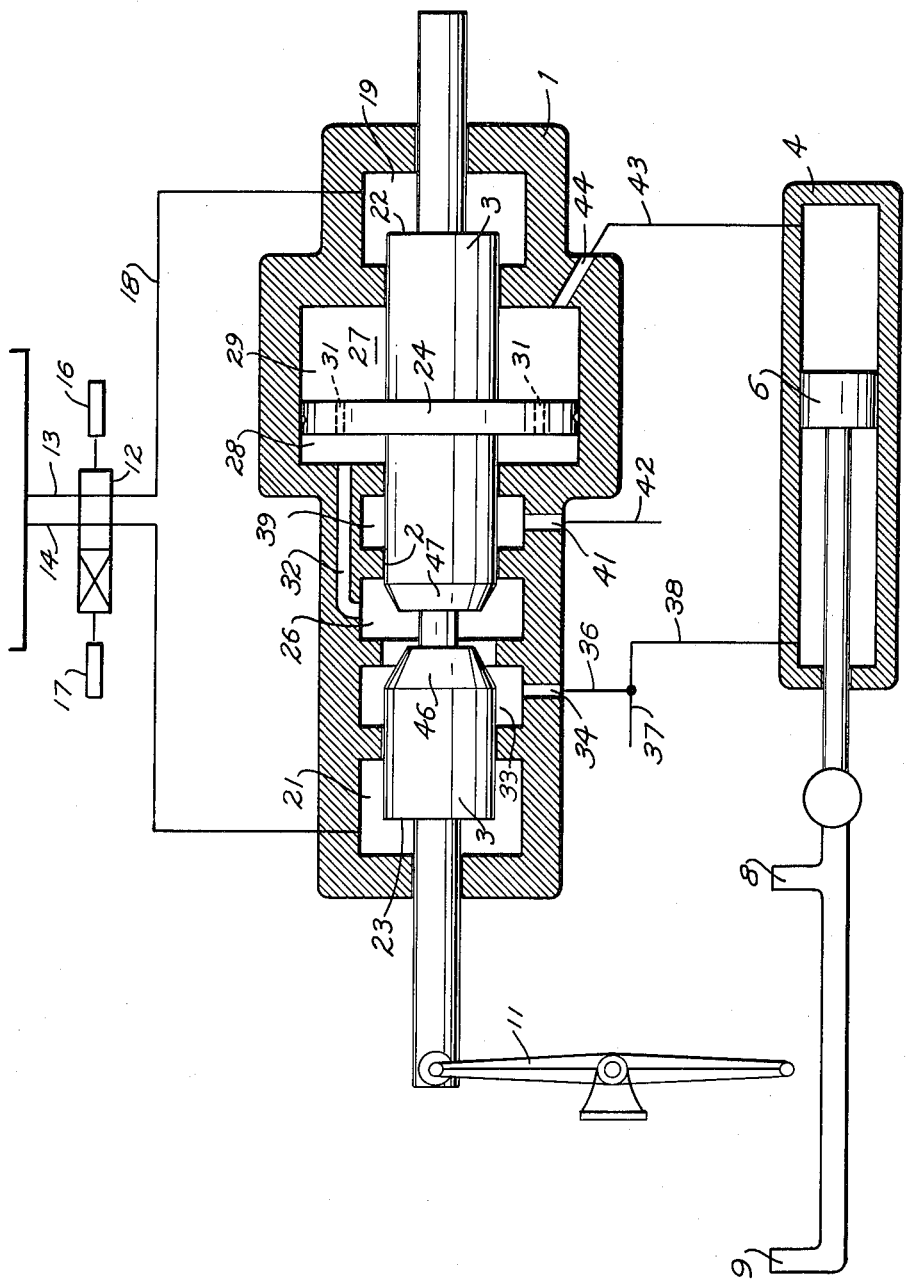

3,199,410
MULTI-FUNCTION CONTROL VALVE APPARATUS
Ralph F. Hereth, Port Orchard, Wash., assignor to the United States of America as represented by the Secretary of the Navy
Filed Jan. 31, 1964, Ser. No. 341,807
8 Claims. (Cl. 91—47)
(Granted under Title 35, U.S. Code (1952), sec. 266)

The invention described herein may be manufactured and used by or for the Government of the United States of America for governmental purposes without the payment of any royalties thereon or therefor.

The present invention relates to control valves and, in particular, to fluid valve apparatus of the type used for controlling the movement of a load between two or more fixed positions.

A primary object of the invention is to provide in a single unit the operations of a main directional valve, pressure compensated flow control valves, and limit stop and deceleration valves.

A related object is to provide such combined operations in a valve utilizing a single spool.

Yet another object is to provide a compact, simple, reliable and relatively inexpensive apparatus for accomplishing the purposes stated in the foregoing objects.

The objects of the invention generally are accomplished by selectively applying fluid pressure to one or the other end portions of a valve stem, the direction of the pressure preferably being controlled by a solenoid-operated pilot valve. The valve stem extends through a main control valve casing and, in particular, through a so-called metering fluid chamber and through a sensing fluid chamber. A pressure inlet and outlet are provided, one on each side of the metering fluid chamber, while the valve stem at each side of this chamber is provided with metering valve means, most suitably, the means being tapered valve seats capable of metering inlet pressure into the chamber and also of metering outlet fluid from the chamber to tank. The metered inlet pressure is permitted to proceed into the sensing fluid chamber which derives its name from the fact that it includes a sensing piston carried by the valve stem and partitioning the chamber into first and second sides, the metered fluid being applied to the first side. Also, the sensing piston is by-passed by velocity control orifices so as to permit a controlled flow from the first side to the second or vice versa.

The second side of the sensing fluid chamber is placed in communication with an actuator mechanism which, most suitably, is a cylinder mounting a fluid-driven reciprocating piston. Fluid pressure from the sensing chamber drives the piston in one direction, while system pressure supply, preferably, the same pressure supply used for the pilot valve, produces the return movement. Also, the system pressure end of the cylinder is communicated with the inlet pressure to the main control valve.

In operation, pressure acting against the partitioning sensing piston tends to move that piston in a particular direction, but the tendency is resisted by the fluid pressure from the pilot valve acting on an end of the valve stem. The arrangement is such that the pressure differential across the sensing piston eventually cancels-out the pressure acting on the end of the valve stem to maintain the sensing piston in a balanced disposition. The movement of the sensing piston, in turn, determines the metering capacity into or out of the metering fluid chamber and, of course, this metering capacity determines the flow rate of the fluid which acts upon the actuator piston.

To decelerate and stop the valve, the actuator piston is directly or indirectly coupled to a mechanical drive, which, in turn, mechanically reciprocates the valve stem to gradually restrict the metering capacity and eventually shut it off. The actual manner in which the components function will be better understood with reference to the detailed description.

One embodiment of the invention is illustrated in the accompanying drawing, this drawing being a hydraulic schematic showing the structural parts of the valve and the actuator cylinder in vertical section.

Referring to the figure, the illustrated structural portions include a main control valve casing 1 having a longitudinal bore 2 specially shaped to receive a valve stem 3 which itself is formed with special configurations that will be described. The structure further includes an actuator cylinder 4, which, although it is shown spaced from casing 1, normally would be carried by the casing in any appropriate manner.

An actuator piston 6 is reciprocably mounted in cylinder 4, the piston extending outwardly of the cylinder where it is coupled to an actuator rod having spaced flanges 8 and 9. Flanges 8 and 9 provide, in effect, cam surfaces adapted, upon reciprocation of the piston, to bear against a rocker arm 11 which, as will be noted, is pinned to an outwardly-projecting end of stem 3. In the apparent manner, cam flanges 8 and 9, and rocker arm 11 provide a mechanical drive capable of mechanically reciprocating valve stem 3.

One of the features of the invention is that, in addition to the mechanical reciprocation of the valve stem, the stem also is fluid-pressure driven at each end. A solenoid-actuated pilot valve 12 is employed to control the fluid pressure used for reciprocating the piston and, again, even though the valve is illustrated as being separate from main control valve casing 1, it will be apparent that it could be mounted directly on the casing. In actual practice, it would be so mounted. Pilot valve 12 includes a pressure line 13, a tank line 14 and a pair of solenoids 16 and 17. As illustrated, solenoid 16 has been energized to supply pressure to the valve through a fluid pressure line 18 communicated with a pilot valve pressure chamber 19 which is provided interiorly of casing 1. In like manner, tank line 14 is coupled by a line 21 to another pilot valve pressure chamber 21, although in this instance the term pressure chamber is a bit misleading since the chamber actually is communicated with tank. It further is to be noted that valve stem 3 projects into pressure chambers 19 and 21 and that, within each of these chambers, the stem is provided with a shoulder or flanged portion 22, 23 each of which provides a predetermined surface area against which the pressure of the fluid within the chamber acts to drive the valve stem axially within the bore of the casing.

Obviously, when solenoid 17 is energized, pressure is supplied to chamber 21 while chamber 19 then is connected to tank. In this instance the valve stem is driven in its opposite axial direction.

Another particular feature of the invention is the provision of a sensing piston 24 and a special metering-fluid chamber 26. As seen, sensing piston 24 is carried by valve stem 3 and it is used to partition a sensing fluid chamber 27 into a first side 28 and a second side 29. Of a particular significance, which will be described later, is the fact that sensing piston 24 is provided with a plurality of velocity control orifices 31 permitting fluid flow between the first and second sides of the sensing fluid chamber. Also, it is to be noted that metering fluid chamber 26 couples to first side 28 of the sensing fluid chamber by means of a passageway 32.

Before describing the manner in which these particular elements cooperate to achieve the desired valve operations, several other significant features should be noted. First, it is especially important to note that metering fluid chamber 26 has on its left side a pressure inlet chamber 33 coupled to a pressure source by an inlet passage 34 and fluid lines 36 and 37. Further, the pressure in line 37 is coupled to the left-hand end of actuator cylinder 4 by a line 38.

On the right side of metering fluid chamber 26 is an outlet fluid chamber 39 which couples to tank through a passage 41 and line 42.

To complete the fluid circuit, the right-hand end of actuator cylinder 4 is coupled to second side 29 of the sensing fluid chamber by means of a line 43 and a passage 44.

Finally, but of substantial importance, the portions of valve stem 3 which are adapted to be moved into and out of metering fluid chamber 26 are provided with tapered valve seats or lands 46 and 47. It will be appreciated that, as valve stem 3 moves to the left, seat 46 gradually increases the size of the orifice between inlet pressure chamber 33 and metering chamber 26 so as to meter the flow of the pressure in a controlled manner. Similarly, as valve stem 3 moves to the right, tapered seat 47 meters flow from metering chamber 26 into outlet chamber 39.

The purpose of the arrangement best can be appreciated by considering the manner in which the valve controls the fluid flow necessary for driving actuating piston 6 and actuator arm 7 which, for present purposes, can be considered as the load to be moved between two fixed positions. In actual practice, if desired, actuator arm 7 could be used to control other mechanism which, in turn, would provide the direct motive force for the load.

In a general manner, the valve programs the entire cycle from a retracted position of the actuator arm to an extended position and return, with speed control compensated for load variation. The particular functions controlled include direction, acceleration, constant velocity, deceleration, stop and hold at extended position, followed by reversal, acceleration, constant velocity deceleration, and stop and hold at the retracted position.

First considering the portion of the cycle from a retracted position of the actuator arm to an extended position, movement is initiated by energizing solenoid 16 to admit fluid pressure to pilot chamber 19, this pressure then acting on shoulder 22 to drive spool 3 to the left as shown in the drawing. Concurrently, however, the same pressure applied to the pilot valve also is admitted to pressure inlet chamber 33 with the result that, when the spool moves to the left, metering seat 46 provides an orifice to permit a metered flow from chamber 33 into metering fluid chamber 26 and on to side 28 of the sensing fluid chamber 27 through passage 32. This initial fluid flow into side 28 passes through velocity control orifices 31 into opposite side 29 of the sensing chamber, and, from this side 29, it also passes through lines 44 and 43 into the right-hand end of actuator cylinder 4. Obviously, a pressure differential is created across sensing piston 24 and the differential causes the sensing piston and stem 3 to move either to the left or to the right to restrict or increase the metered flow through the orifice provided between valve seat 46 and the bore of the casing.

Eventually, sensing piston 24 reaches a balanced state although the state is one in which it can float to compensate for load variations and the like. Balance is achieved when the pressure differential across the sensing piston multiplied by the area of the sensing piston equals the system pressure multiplied by the effective surface area of shoulder 22 of the valve stem. As will be noted, the system pressure acting on shoulder 22 opposes the pressure differential across sensing piston 24. At this balance point, there is a metered flow rate through the valve and into the right-hand end of cylinder 4, this flow causing piston 6 to move to the left as shown in the drawing. Movement to the left is permitted since pressure in the left-hand end of cylinder 4 can exhaust through line 38. Thus, in the absence of load variations, the metered flow rate causes the piston to extend at a constant velocity.

If loads variations are experienced, the load is reflected onto piston 6 so as to vary the pressure tending to move the piston to the left and also vary the pressure differential across the sensing piston. Consequently, the variation of the pressure differential again acts to re-position the metering valve to, for example, increase the flow rate to overcome any increased load. Reductions of the load will react in a similar manner to restrict the metering so that a constant velocity still is maintained.

The piston extends or moves to the left until flange 8 contacts rocker arm 11 to impose a mechanical force on the valve stem which moves the valve stem to the right to gradually restrict and eventually shut off the metering. In this manner, the valve mechanism functions to decelerate and eventually stop and hold the load at an extended position.

To move the load from an extended position back to its retracted position, solenoid 17 is energized to apply fluid pressure to chamber 21 to force the valve stem to the right to maintain the closed position of the metering orifices normally provided by valve seat 46. However, movement of the valve stem to the right communicates metering fluid chamber 26 with outlet chamber 39, the communication being across valve seat 47 which again provides metering orifices to control the flow rate. Movement of piston 6 is caused by pressure being applied through line 38 to the left-hand side of the piston, and this movement is permitted because the right-hand side of cylinder 4 connects to tank through sensing chamber 27, passageway 32, metering chamber 26, outlet chamber 39.

As in the extension cycle, the velocity of the retraction cycle is constant because sensing piston again reaches a balanced disposition. In this instance, balance is achieved when the pressure differential applied across sensing piston 24 multiplied by the area of the sensing piston equals the system pressure multiplied by the effective area of shoulder 23. If the differential increases or decreases, valve stem 3 moves to the right or to the left to vary the metered flow sufficiently to restore the desired balanced condition. Also, variations in load are compensated in the manner previously described in relation to the extension cycle.

The deceleration of the retraction cycle and the eventual stopping and holding of the load at a fully retracted position is achieved in the reverse manner to that already described with regard to the extension cycle. Thus, movement of the actuator piston to the right eventually causes flange 9 to contact rocker arm 11 to move the valve stem to the left to gradually restrict the metering flow and ultimately stop it altogether.

The normal position of the valve, as will be readily apparent, is one in which there is no flow into or from metering chamber 26. In other words, valve seats 46 and 47 completely cut off flow in one direction or the other.

The advantages of the present control valve apparatus now should be relatively obvious. First, it is a directional valve since the extension or retraction of the load is determined by positioning of the pilot valve. Also, acceleration is controlled and the extension and retraction both are accomplished at a constant velocity achieved by the balancing of the pressure differential across the sensing piston against the pilot pressure. Load variations also are quickly compensated since the sensing piston responds to these variations to vary the metering capacity of the valve. Finally, acceleration and deceleration is controlled by mechanical feed-back from the actuator piston. However, the principal advantage of the mechanism lies in its ability to achieve these numerous valve operations utilizing a single valve stem and relatively simple yet reliable structure.

Obviously many modifications and variations of the present invention are possible in the light of the above teachings. It is therefore to be understood that within the scope of the appended claims the invention may be practiced otherwise than as specifically described.

What is claimed is:

1. Multifunction fluid valve apparatus and fluid pressure reciprocable actuating means comprising:

a main control valve casing provided with a longitudinal bore formed with a fluid sensing chamber, a valve stem axially reciprocable in said bore and carrying a sensing piston partitioning said chamber into first and second sides, control orifice means intercommunicating said first and second sides, said bore further being formed with a metering fluid chamber having a means for fluid intercommunication with said first side of the sensing chamber, fluid pressure inlet and outlet means disposed respectively one on each side of said metering fluid chamber, a pair of metering valve means carried by said stem and disposed one for metering pressure inlet flow into said metering chamber and the other for metering fluid flow from said metering chamber to said fluid outlet means, means for mechanically reciprocating said valve stem in its axial direction, fluid-pressure reciprocable actuating means having a fluid pressure inlet and also being in fluid communication with said second side of the sensing chamber, and controllable fluid pressure means for selectively reciprocating said valve stem in one axial direction or the other, said controllable fluid pressure acting on the ends of said stem in counteracting opposition to pressure differentials across said sensing piston whereby a pressure balance across said piston is obtainable for producing a controlled and metered flow rate to and from said actuator means, and said mechanical reciprocations of the stem being responsive to predetermined dispositions of the actuator means reciprocations for restricting and stopping said pressure inlet and outlet flow of said metering chamber.

2. Multifunction fluid valve apparatus and fluid pressure reciprocable actuating means comprising:

a main control valve casing provided with a longitudinal bore formed with a fluid sensing chamber, a valve stem axially reciprocable in said bore and carrying a sensing piston partitioning said chamber into first and second sides, control orifice means intercommunicating said first and second sides, said bore further being formed with a metering fluid chamber having a means for fluid intercommunication with said first side of the sensing chamber, fluid pressure inlet and outlet means disposed respectively one on each side of said metering fluid chamber, a pair of metering valve means carried by said stem and disposed one for metering pressure inlet flow into said metering chamber and the other for metering fluid flow from said metering chamber to said fluid outlet means, a fluid pressure actuator cylinder having a fluid pressure inlet and being in fluid communication with said second side of the sensing chamber, fluid pressure reciprocably-driven actuator means in said cyinder, means responsive to said actuator means reciprocation for mechanically reciprocating said valve stem in its axial direction, and manually-controllable fluid pressure means for selectively reciprocating said valve stem in one axial direction or the other, said controllable fluid pressure acting on the ends of said stem in opposition to pressure differentials across said sensing piston, and said mechanical reciprocation of the stem being initiated at spaced positions of said actuator means for restricting and stopping said pressure inlet and outlet fluid flow of said metering chamber.

3. The apparatus of claim 1 wherein said controllable fluid pressure means is a pilot valve, said valve casing bore being formed at each end with fluid tight pilot pressure and tank chambers each in fluid communication with the pilot valve, and said valve stem extending into each of said pilot chambers and being provided therein with a shoulder portion providing a predetermined fluid contact area.

4. The apparatus of claim 3 wherein the valve stem projects outwardly through one of said pilot valve chambers, and said means for mechanically reciprocating said stem is coupled to said outwardly projecting end.

5. The apparatus of claim 3 further including a source of system pressure serving both said pilot valve and said fluid pressure means of the main valve casing.

6. The apparatus of claim 1 wherein said metering valve means of said valve stem are provided by a pair of oppositely-tapered lands.

7. The apparatus of claim 1 wherein said actuating means includes:

a fluid pressure cylinder, a piston reciprocated in one direction by fluid flow from said second side of the sensing chamber and in the other by said pressure inlet flow, and an actuator arm provided with spaced means for initiating the mechanically-induced reciprocations of the valve stem.

8. The apparatus of claim 1 wherein said pressure balance across said sensing piston is adjusted for producing a pressure on said second side of the sensing chamber that is 10% less than the pressure on its first side.

References Cited by the Examiner
UNITED STATES PATENTS 702,979    6/02   Martin _____ 91—416
2,367,009  1/45   Davis _____ 91—47

SAMUEL LEVINE, *Primary Examiner.*

FRED E. ENGELTHALER, *Examiner.*